United States Patent [19]

Smithwick, Jr.

[11] 3,843,658
[45] Oct. 22, 1974

[54] O-METHYL ACRONYCINE SALT
[75] Inventor: Edward L. Smithwick, Jr., Indianapolis, Ind.
[73] Assignee: Eli Lilly and Company, Indianapolis, Ind.
[22] Filed: June 18, 1973
[21] Appl. No.: 371,082

[52] U.S. Cl............................. 260/279 R, 424/257
[51] Int. Cl............................................. C07d 37/16
[58] Field of Search ................................ 260/279 R

[56] References Cited
OTHER PUBLICATIONS
T. R. Govindachari et al., Tetrahedron, 1966, Vol. 22, p. 3245.

Primary Examiner—Donald G. Daus
Assistant Examiner—Mark L. Berch
Attorney, Agent, or Firm—James L. Rowe; Everet F. Smith

[57] ABSTRACT

O-methyl acronycine fluorosulfonate, water soluble derivative converted to acronycine at near physiologic pH.

2 Claims, No Drawings

O-METHYL ACRONYCINE SALT

BACKGROUND OF THE INVENTION

Most of the agents useful in inhibiting the growth of malignant tumors discovered to date have either been alkylating agents, of the nature of the nitrogen mustards, or anti-metabolites for vitamins and nucleic acids, such as 8-azaguanine, 5-fluoronicotinic acid, and the like. Recently a group of novel alkaloids, obtainable in pure form from the plant *Vinca Rosea*, have been found to be particularly valuable in the treatment of leukemias and have shown activity against various solid tumors. These alkaloids have a chemical structure which is totally unrelated to any known anti-tumor agent, and they apparently act in a manner distinctly different from such other agents.

Acronycine, also known as acronine, was isolated from the bark of the Australian scrub ash or scrub yellow wood, *Acronychia Baueri Schott*, (also known as *Bauerella Australiana Borzi*) by Lahey and co-workers (Australian J. Sci. Res. 2A, 423-b (1949)). A description of the physical properties of the purified material is given in ibid, 3A, 593-614 (1950). Acronycine has shown outstanding antineoplastic activity against a series of transplanted tumors in mice including B-82 leukemia, C-4198 leukemia, Ridgeway osteogenic sarcoma, X-5563 myeloma, and Shionogi carcinoma 115, as well as other tumors. The activity of acronycine as an antineoplastic agent is set forth in a publication by Svoboda et al., "*Alkaloids of Acronychia Baueri Schott I*," J. Pharm. Sci. 55, 75 8, (1966). The drug is presently a subject of an Investigational New Drug application (IND) before the Food and Drug Administration and is undergoing a clinical trial in humans.

A recurring problem with the initiation of a clinical trial of acronycine has been the inability to obtain significant blood levels of the drug upon oral administration to volunteer subjects. Part of this failure is ascribable to the extreme insolubility of acronycine in water. It is an object of this invention to provide an acronycine derivative of increased water solubility.

SUMMARY OF THE INVENTION

In fulfillment of the above and other objects this invention provides a novel acronycine derivative which is water soluble and is reconverted to acronycine at pH's close to physiologic pH of the following structure:

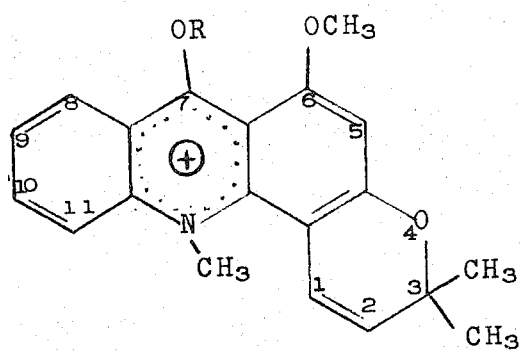

wherein R is $C_1$-$C_3$ alkyl.

When R is methyl, the above compound is named systematically 6,7-dimethoxy-3,3,12-trimethyl-1H-pyrano[2,3-c] acridin-12-ium fluorosulfonate, but it will be called O-methyl acridinium fluorosulfonate. Other compounds in which R is ethyl, n-propyl or isopropyl are named accordingly.

Compounds according to the above formula are prepared by reacting acronycine with a $C_1$-$C_3$ alkyl fluorosulfonate in a suitable inert solvent at dry ice temperatures or below and then allowing the reaction mixture to warm up with stirring to about 0° C. Evidence of reaction is given by a color change of the solution as it warms from yellow to a deep red color typical of the pyridinium (acridinium) salt present. The preparation of a typical compound of this invention is illustrated in the following specific example.

EXAMPLE 1

O-methyl acronycine fluorosulfonate

A solution containing 3.22 g. of acronycine and 0.9 ml. of methyl fluorosulfonic acid was prepared in 40 ml. of methylene chloride at about −70° C. The reaction mixture was stirred at that temperature for about 10 minutes and was then allowed to warm to about 4° C. during which warming the original yellow solution turned a deep red. The reaction mixture was kept at about 4.0° C. overnight. Dilution of the red solution with anhydrous ether yielded a precipitate of O-methyl acronycine fluorosulfonate which was collected and dried in vacuo; yield = 3.45 g. The dried salt had the following characteristic nmr peaks: 1.6 ppm (S, 6H); 4.2 ppm (S, 3H); 4.35 ppm (S, 3H); 4.5 ppm (S, 3H); 5.75, 6.85 ppm (M, 2H); 6.65 ppm (S, 1H).

Solution of the above obtained red solid in water followed by adjustment of the pH to about 8 with 1-N-aqueous sodium bicarbonate resulted in a disappearance of the red color in the formation of a precipitate which precipitate turned out to be acronycine. The same reaction takes place at pH = 7, although the reaction is slower. Acronycine can be isolated from the bicarbonate solution by extraction with ethyl acetate separation of the ethyl acetate layer and removal of the solvent in vacuo.

Other O-alkyl acronycine salts can be prepared from the fluorosulfonate salt by standard metathetical procedures, including the use of ion exchange resins. For example, treatment of O-methyl acronycine fluorosulfonate with calcium chloride at acid pH will yield the corresponding chloride salt and an insoluble precipitate of

calcium fluorosulfonate. Other similar transformations to provide nitrate, sulfate, phosphate and the like salts can be readily devised by those skilled in the art.

O-methyl acronycine fluorosulfonate and the other O-alkyl acronycine salts represented by the above formula are useful in the treatment of tumors in mammals. An aqueous solution of O-methyl acronycine fluorosulfonate for example can be administered by either the oral or intraperitoneal route to a mouse or other mammal in whom a tumor is growing or in which has been transplanted. For oral administration, the compound may be either administered as an aqueous solution or the solid salt can be admixed with standard excipients such as starch, and the mixture loaded into telescoping gelatin capsules. The dosages of compounds of this invention employed in anti-tumor therapy should be equivalent to those normally employed with acronycine itself, said dosages being from 1 to 100 mg/kg of mammalian body weight per day. The O-methyl acronycine salts of this invention have substantially the same tumor spectrum as does acronycine itself and are useful in treating the same tumors which are growing in mammalian hosts. In particular, the compounds of this invention should have utility in the treatment of multiple myeloma in humans as does acronycine.

I claim:

1. A compound of the following structure

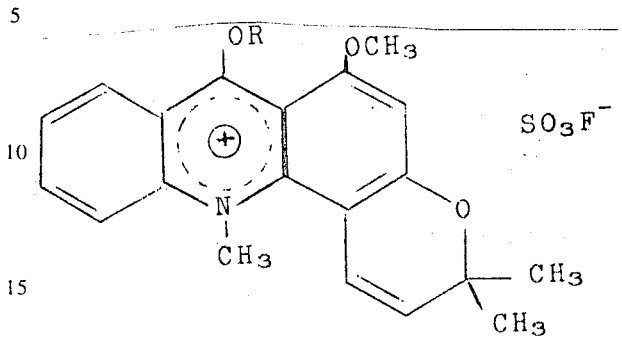

wherein R is $C_1$–$C_3$ alkyl.

2. A compound according to claim 1 said compound being O-methyl acronycine fluorosulfonate.

* * * * *